US009175167B2

(12) United States Patent
Mueller-Zell

(10) Patent No.: US 9,175,167 B2
(45) Date of Patent: Nov. 3, 2015

(54) POROUS CERAMIC BODIES AND PROCESS FOR THEIR PREPARATION

(71) Applicant: Imerys Ceramics France, Paris (FR)

(72) Inventor: Axel Mueller-Zell, Selb (DE)

(73) Assignee: IMERYS CERAMICS FRANCE, Paris (FR)

( * ) Notice: Subject to any disclaimer, the term of this patent is extended or adjusted under 35 U.S.C. 154(b) by 0 days.

(21) Appl. No.: 14/594,009

(22) Filed: Jan. 9, 2015

(65) Prior Publication Data

US 2015/0125600 A1  May 7, 2015

Related U.S. Application Data

(62) Division of application No. 13/960,309, filed on Aug. 6, 2013, now abandoned, which is a division of application No. 12/672,333, filed as application No. PCT/EP2008/060402 on Aug. 7, 2008, now abandoned.

(30) Foreign Application Priority Data

Aug. 8, 2007 (EP) ..................... 07113980

(51) Int. Cl.
*C09C 3/06* (2006.01)
*C04B 38/00* (2006.01)
*C04B 33/24* (2006.01)
*C04B 33/30* (2006.01)

(52) U.S. Cl.
CPC ................. *C09C 3/063* (2013.01); *C04B 33/24* (2013.01); *C04B 33/30* (2013.01); *C04B 38/0096* (2013.01); *C04B 2235/664* (2013.01); *C04B 2235/77* (2013.01); *C04B 2235/96* (2013.01); *Y10T 428/249956* (2015.04)

(58) Field of Classification Search
CPC .... C09C 3/063; C04B 33/24; C04B 38/0061; C04B 38/0096; C04B 38/0665–38/0685
See application file for complete search history.

(56) References Cited

U.S. PATENT DOCUMENTS

| 4,917,857 | A |   | 4/1990 | Jaeckel et al. |
| 4,936,939 | A |   | 6/1990 | Woolum |
| 5,171,721 | A |   | 12/1992 | Nanataki et al. |
| 5,183,608 | A |   | 2/1993 | Guile |
| 5,258,150 | A | * | 11/1993 | Merkel et al. .................. 264/43 |
| 5,762,895 | A | * | 6/1998 | Schwetz et al. ............... 423/345 |
| 6,057,030 | A |   | 5/2000 | Mano |
| 6,416,852 | B1 | * | 7/2002 | Kawasaki et al. .......... 428/304.4 |
| 6,800,360 | B2 |   | 10/2004 | Miyanaga et al. |
| 2001/0021389 | A1 | * | 9/2001 | Starling et al. ................. 424/422 |
| 2003/0180171 | A1 |   | 9/2003 | Artz et al. ........................ 419/2 |
| 2004/0013861 | A1 |   | 1/2004 | Miyanaga et al. ............. 428/210 |
| 2004/0076806 | A1 |   | 4/2004 | Miyanaga et al. |
| 2005/0161849 | A1 |   | 7/2005 | Ohno et al. |
| 2005/0250640 | A1 | * | 11/2005 | Meier et al. ..................... 501/81 |
| 2006/0228247 | A1 |   | 10/2006 | Grohowski |
| 2007/0152364 | A1 |   | 7/2007 | Zuberi et al. ................. 264/45.1 |

FOREIGN PATENT DOCUMENTS

| CN | 1458913 A | 11/2003 |
| EP | 119913 A1 | 9/1984 |
| EP | 0 545 008 A1 | 6/1993 |
| EP | 1 598 147 A2 | 11/2005 |
| JP | 2000-344585 A | 12/2000 |
| WO | WO 03/076109 A2 | 9/2003 |
| WO | WO 2009/019305 A2 | 2/2009 |

OTHER PUBLICATIONS

Zhang, Guo-Jun; Yang, Jian-Feng; and Ohji, Tatsuki, "Fabrication of Porous Ceramics with Unidirectionally Aligned Continuous Pores" J. Am. Ceram. Soc, 84 [6], pp. 1395-1397, 2001.
Deng, Zhen-Yan; Fukusawa, Takayuki; and Ando, Motohide, "Microstructure and Mechanical Properties of Porous Alumina Ceramics Fabricated by the Decomposition of Aluminum Hydroxide", J. Am. Ceram. Soc., vol. 84, No. 11, Nov. 2001, pp. 2638-2644.
First Office Action issued Mar. 26, 2012, in related Chinese Application No. 200880102310.7, 7 pages.
International Search Report and Written Opinion for International Application No. PCT/EP2008/060402.
Machine Translation of EP 119913A1 performed by ESPACENET Google Translate on Apr. 11, 2013.
Machine Translation performed Apr. 2012 for JP2000-344585.
Certified English Translation of JP 2000-344585, dated Apr. 2012.

* cited by examiner

*Primary Examiner* — Erin Snelting
(74) *Attorney, Agent, or Firm* — Finnegan, Henderson, Farabow, Garrett & Dunner, L.L.P.

(57) ABSTRACT

A process for producing a porous ceramic body comprises a) mixing a coated porogen with a silicate or a oxide ceramic precursor, wherein the porogen is decomposable to gaseous decomposition products and optionally solid products upon heating, and is coated with a coating agent; b) forming a green body from the mixture obtained in step (a); and c) firing the green body obtained in step (b) to obtain the ceramic body, whereby the porogen decomposes to form pores within the ceramic body and the coating agent is deposited at the inner surface of the pores. The porogen is coated with a coating agent which, upon firing, is deposited at the inner surface of the ceramic pores, so that porous ceramics having decreased weight and improved porosity are obtained, while maintaining at the same time good mechanical strength. A green body and a porous ceramic body obtainable with the above-mentioned process are described too.

17 Claims, No Drawings

POROUS CERAMIC BODIES AND PROCESS FOR THEIR PREPARATION

This application is a divisional application of U.S. application Ser. No. 13/960,309, filed on Aug. 6, 2013, which is a continuation application of U.S. application Ser. No. 12/672,333, filed on Mar. 12, 2010, a U.S. national stage entry under 35 U.S.C. §371 from PCT International Application No, PCT/EP2008/060402, filed Aug. 7, 2008, and claims priority to and the benefit of the filing date of EP Application No. 07113980.2, filed Aug. 8, 2007, the subject matter of all of which are incorporated herein by reference.

FIELD OF THE INVENTION

The present invention concerns a process for preparing lightweight porous ceramics by using porogens coated with a coating agent; the porous ceramic bodies obtained after decomposition of the porogen upon firing show an advantageous density reduction without a significant impairment of the mechanical strength, a more homogeneous total porosity and improved closed porosity.

BACKGROUND OF THE INVENTION

Ceramic materials are commonly provided with a natural porosity determined by the composition and the grain structure of the raw materials, and by the driving out of the water during drying and firing. This natural porosity can be insufficient for application situations where it is important to assure a good thermal and electrical insulation, in addition to refractory properties, and where a reduced weight is required.

Various ceramic products with higher porosity levels have been developed in the art; the incorporation of pores is commonly obtained by means of so-called porogens, i.e., pore forming materials such as graphite, polymer beads or fibres, which burn, evaporate or gasify upon heating without leaving residues. Porogens are commonly premixed with the ceramic precursors and volatilize during the firing step, thus leaving pores in the ceramic body which correspond to the space originally occupied by the porogen particles.

The obtained porous ceramics, having reduced density and weight, are commonly used in a wide range of applications, such as tableware, sanitaryware, tiles, insulators, and various building and construction materials.

For instance, U.S. Pat. No. 5,171,721 describes porous ceramic sheets, which are obtained by mixing a ceramic powder with planar or elongate flakes, such as graphite, starch and sugar, which disappear upon application of heat to provide generally planar or elongate pores corresponding to the flakes. The sheets are used as a protective layer for electrodes. U.S. Pat. No. 6,057,030 discloses porous ceramic bodies characterized by a plurality of interconnected pores, obtained by mixing a powdered ceramic component, such as alumina, with pore-forming polymeric beads, such as polymethylmethacrylate beads, compressing the obtained mixture and finally heating it to vaporize the polymeric beads.

The mechanical strength of the fired ceramic is usually directly related to the ceramic's density, i.e. dense ceramics are generally stronger than porous ceramics. In fact, while the introduction of voids in the ceramic material has very positive effects on thermal and electrical insulation properties of the material and also allows a reduced weight, the presence of voids may also lead to a disadvantageous strength reduction. Dramatic reduction of modulus of rupture can be experienced when high levels of porosity are introduced in the ceramic, and in particular open porosity. Open porosity not only reduces melt strength, but also allows water and moisture to penetrate in the ceramic body, which is undesired for many traditional ceramic applications; in fact, open porosity is determined by the pores which are connected to the surface of the ceramic and linked with each other.

As known in the art, the decrease in mechanical strength may be partially avoided by controlling homogeneity of the pore distribution. US Statutory Invention Registration H48 of Apr. 1, 1986 describes a porous ceramic article obtained by using thermally degradable beads, such as polystyrene foam beads, in the presence of a binder capable of taking a set, such as an epoxy resin; after forming the desired ceramic article, heat is applied to degrade and volatilize both the beads and the binder.

US2006/0228247 describes the use of homogenizing agents, such as alcohols, isoparaffinic solvents or polyethyleneglycol, which maintain a uniform distribution of the pore-forming agents within a metal or a ceramic mass. The pore-forming agents are metal salts which are removed by water extraction after the desired article has been formed, thus avoiding high temperature vaporization or other severe measures that may alter the character of the final porous article. Nevertheless, the obtained porous ceramics are still unsatisfactory as regards mechanical strength.

Further problems associated to the use of high amounts of porogens are caused by the quick decomposition and combustion of the porogens upon heating, which may lead to cracking in a moulded body. An attempt to solve this problem is disclosed in US2005/0161849, wherein the pore-forming material is composed of inorganic particles contained in hollow organic polymer particles, such as polymer micro-balloons; the inorganic particles are transferred into the polymer particles by degassing. The presence of inorganic particles in the pore-forming material decreases the relative amount of organic material, thus avoiding the occurrence of local heat shocks during the heating step.

Therefore, there is a need for developing ceramic porous materials having decreased weight and excellent thermal and electrical insulation properties, while at the same time maintaining good mechanical strength.

SUMMARY OF THE INVENTION

The Applicant has surprisingly found that the above-mentioned problems may be solved by using a porogen coated with a coating agent which, upon firing, is deposited at the inner surface of the ceramic pores; by using specific coated porogens, it is possible to obtain porous ceramics having decreased weight and improved porosity, while maintaining at the same time good mechanical strength. In one aspect, the present invention provides a process for producing a porous ceramic body, comprising:

a) mixing at least a coated porogen with at least a silicate or an oxide ceramic precursor, wherein the porogen is decomposable to gaseous decomposition products and optionally solid products upon heating, and is coated with a coating agent;

b) forming a green body from the mixture obtained in step (a); and c) firing the green body obtained in step (b) to obtain the ceramic body, whereby the porogen decomposes to form pores within the ceramic body and the coating agent is deposited at the inner surface of the pores.

In another aspect, the invention provides a green body comprising a mixture of at least a coated porogen intermixed with at least a silicate or an oxide ceramic precursor, wherein the porogen is decomposable to gaseous decomposition products and optionally solid products upon heating, and is coated with a coating agent.

In a further aspect, the invention provides a porous ceramic body having total porosity of at least 10%, open porosity lower than 1.5% and closed porosity of at least 8.5%, wherein the inner surface of the pores is covered by the thermolysis product of a porogen coated with a coating agent; the porous ceramic body is obtainable by heating a mixture of at least a coated porogen with a ceramic precursor, whereby the porogen decomposes to form pores within the ceramic body and the coating agent is deposited at the inner surface of the pores.

DETAILED DESCRIPTION OF THE INVENTION

The process of the present invention comprises mixing at least a coated porogen with a ceramic precursor. The porogen used in the process of the invention must be able to decompose to gaseous and optionally solid decomposition products upon heating, thus leaving the ceramic pores after the material is burned out. For example, the porogen can thermally decompose by burning and/or evaporation.

According to an embodiment, the porogen is a carbon or an organic compound, preferably selected from the group consisting of graphite, cellulose, starch, organic polymers and mixtures thereof. Suitable organic polymers comprise homo and copolymers of acrylic and methacrylic acid and esters, styrene, ethylene, propylene and vinylchloride, as well as polyamides and polyesters.

In some embodiments, the porogen can include carbon or organic spherical particles, fibres or mixtures thereof; spherical particles can have a diameter higher than 5 μm, preferably ranging from 10 to 500 μm, and more preferably from 10 to 100 μm; carbon or organic fibres can have an average length ranging from 100 to 1000 μm, and an average width ranging from 15 to 40 μm, with a ratio width/length of about 1:5 to 1:50.

The porogen is coated with a coating agent which may be a sintering or a reacting component. The coating agent can be a silicate ceramic or an oxide ceramic acting as a sintering component, preferably selected from the group consisting of quartz, silica, kaolin, chamotte, mullite, alumina, zirconia, yttrium oxide, titanium oxide, magnesium oxide, calcium oxide, barium oxide and mixtures thereof. Even more preferably, the coating agent is nano-sized alumina, nano-sized silica or mixtures thereof which highly increase the strength of the final product after firing.

When the coating agent is a reacting component, it may be selected from the group consisting of feldspar, glass, frits, syenites, aluminium hydroxide, aluminium oxide hydrate, aluminium nitride, silicon nitride, halides of aluminium, yttrium, zirconium and silicon (preferably chlorides thereof such as aluminium trichloride, yttrium tetrachloride, zirconium tetrachloride, silicon tetrachloride), zirconium carbonate, salts of alkaline and alkaline earth metals (like calcium carbonate, magnesium carbonate, calcium hydrogen-carbonate, calcium hydrogen-phosphate, calcium-bis-hydrogen-phosphate) and mixtures thereof. Even more preferably, the coating agent is selected from the group consisting of aluminium hydroxide, calcium carbonate, magnesium carbonate, calcium hydrogen-phosphate and mixtures thereof.

For example, in the case of calcium hydrogen-phosphate, the reacting component may react upon heating to form $Ca_2P_2O_7$, i.e. artificial bone ash. In contrast, $CaCO_3$ can react upon heating to form $CaO$ and $CO_2$ the latter further contributing to the creation of pores.

The coated porogen may be obtained, according to an advantageous method, by adding the coating agent (such as lithium feldspar, calcium carbonate or chalk) to a liquid, such as an alcohol or water, containing the porogen (such as carbon or organic particles and/or fibres) and optionally a binder system; the obtained suspension is then mixed according to conventional methods known in the art.

In case the coating agent is added to an alcohol, the binder system (such as polyacrylate) is preferably soluble in such alcohol but insoluble in the medium forming the ceramic precursor slurry (e.g. water). Alternatively, if the coating agent is added to water, it is preferred to use a binder system, such as long-chained polyvinyl alcohol, which is only soluble at high temperatures (e.g. higher than 90° C.) but insoluble at room temperature when forming the ceramic precursor slurry.

The obtained suspension of coating agent, porogen and optionally binder-system is dried, so that the coating agent forms a covering layer onto the porogen. The obtained coated porogen is ready to be added to a ceramic precursor, preferably in the form of a slurry, e.g. in water; since the binder system is not soluble in water at room temperature, the coated porogen will not be altered. The obtained slurry can be dried according to common procedures, for instance spray dried.

According to an alternative method, the porogen may be added to a solution of calcium hydroxide, obtained by reacting limestone in water, after mixing the obtained suspension, $CO_2$ is added under controlled heating and stirring conditions, at a temperature preferably not higher than 80° C., thus precipitating calcium carbonate, which will deposit onto the porogen particles. Ceramic components such as kaolin, feldspar, quartz and optionally a binder may be then added to the obtained mixture; the obtained slurry can be dried according to standard procedures, for instance spray dried.

According to an embodiment, the amount of coating agent coating the porogen may range from 1 to 40% wt. based on the weight of the coated porogen, preferably from 3 to 20% wt.

The amount of coated porogen in the mixture obtained from step (a) may be at least 5% wt., based on the weight of the mixture, preferably from 10 to 40% wt., more preferably from 20 to 30% wt.

The silicate or oxide ceramic precursor used in the process of the invention may be any silicate and oxide ceramic precursors known in the art, and is preferably selected from the group consisting of quartz, silica, feldspar, kaolin, chamotte, mullite, alumina, zirconia, yttrium oxide, titanium oxide, magnesium oxide, calcium oxide, barium oxide and mixtures thereof.

The ceramic precursor may be in the form of powders, whiskers, platelets or other shapes commonly available in the art.

The ceramic precursor and the coating agent may be the same or different; according to an embodiment, the ceramic precursor is different from the coating agent.

When a dense ceramic product is desired, a sintering aid can be added to the starting mixture. Useful sintering aids are the ones known in the state of the art, and may be chosen depending upon the ceramic precursor employed; for example, CaO, MgO and $SiO_2$ are suitable sintering aids when used with alumina as ceramic precursor.

In step (a) of the process of the invention, the coated porogen and the ceramic precursor are mixed according to conventional methods known in the art; the mixture may optionally contain a dispersant and/or a binder system, known in the state of the art.

The coated porogen and the ceramic precursor may be dispersed in water and mixed, thus obtaining a mixture preferably containing 40 to 60% wt. water. Suitable dispersants may be added to the water mixture, such as sodium silicate or sodium hydroxide, to give a pH of about 8-10; the dispersant is preferably contained in an amount ranging from 0.05 to 0.5% wt. based on the total weight of the mixture.

Suitable binder systems may be polyvinyl alcohol, polyethylene glycol, polyvinyl acetate, silanes and mixtures thereof, and other binders commonly used in the art; the binder is preferably contained in an amount ranging from 0.5 to 2% wt. based on the total weight of the mixture.

Step (b) of the process of the invention comprises forming a green body from the mixture obtained in step (a); the green body may be formed by casting, pressure casting, jiggering, extruding or press processing, all methods known in the state of the art, and preferably by pressure casting or press processing.

The green body is preferably formed at a pressure ranging from 200 to 3000 bars, at a temperature ranging from 15 to 40° C., more preferably at 20-25° C. Casting may be carried out at atmospheric pressure, while pressure casting may be carried out at 20 to 40 bars; press processing may be carried out at 200 to 350 bars with silicate ceramics, while a pressure of 300 to 3000 bars may be applied when press processing oxide ceramics.

When casting or pressure casting is used to form the green body, a water mixture obtained in step (a) may be directly employed; differently, when the green body is formed by jiggering or extruding, the water mixture obtained in step (a) is preferably first dewatered to obtain a water content of about 18 to 25% wt. before jiggering or extruding. Finally, when the green body is formed by press processing, the water mixture obtained in step (a) is preferably dewatered to a water content of 3 to 10% wt. before press processing.

The green body may be finally dried, to a water content lower than 1% wt. water, based on the total weight of the green body.

Step (c) of the process of the invention comprises firing the green body to form a ceramic body, whereby the porogen decomposes to form pores within the ceramic body; the coating agent decomposes to solid components and optionally volatile components upon firing, and the solid components are deposited at the inner surface of the pores.

In general, the term "firing" refers to a heat treatment at high temperature; in the process of the invention, the firing step can be carried out in a conventional and known manner, preferably at a temperature ranging from 150 to 1800° C., for a time ranging from 0.5 to 70 hours, more preferably from 1 to 18 hours.

According to an embodiment, the firing step of silicate ceramics is carried out in two different phases. The first firing phase is carried out under oxidizing conditions, at a temperature ranging from 200 to 1200° C., preferably from 600 to 960° C., for a time comprised between 4 and 18 hours, and preferably between 8 and 12 hours; the second firing phase is carried out under oxidizing and reducing conditions, at a temperature higher than 1000° C., preferably from 1200 to 1400° C., for a time comprised between 1 and 12 hours, preferably between 4 and 6 hours.

According to another embodiment, the firing step of oxide ceramics is carried out under oxidizing conditions, at a temperature raging from 150 to 1200° C. for a time up to 50 hours, and then at a temperature higher than 1200° C., preferably from 1600 to 1800° C., for a time comprised between 1 and 18 hours, preferably between 4 and 12 hours.

The firing step can be carried out under oxidizing or reducing atmosphere, by adding oxidizing or reducing agents or other chemical substances in order to exert a combined physical/chemical activation.

When the firing is accomplished under oxidizing conditions, suitable oxidizing atmospheres may be pure oxygen, oxygen/noble gas mixtures and air, among which air is preferably used for economic reasons. Upon firing under oxidizing atmosphere, the porogen will be decomposed to gaseous decomposition products thus creating voids, while the coating agent coating the porogen will cover at least part of the inner surface of the voids. The coating agent has also the function of homogenising the coated porogens within the ceramic precursor, thus avoiding migration and separation of the coated porogen from the ceramic slurry.

When the firing is accomplished under reducing atmosphere, the coated porogens will decompose to gaseous and solid products; for instance, cellulose particles or fibres will pyrolyse to graphite particles or fibres.

The obtained ceramic body may be glazed according to standard methodologies known in the art.

The process of the invention allows to obtain lightweight porous ceramics of higher quality, having improved porosity, in particular closed porosity, lowered water adsorption, and improved thermal and electrical insulation, at the same time maintaining good mechanical strength properties, as evident from the bending strength values. In fact, the coated porogens described above can help to obtain a more uniform and controlled pore size and pore distribution in the ceramic material.

Moreover, without wishing to be bound by theory, it is believed that the coating agent coating the porogen is deposited at the inner surface of the ceramic pores upon firing, thus giving a smooth and regular inner pore surface; the pore surface regularity highly decreases the occurrence of flaws and cracks. In fact, pore surface irregularities in porous ceramic materials may lead to a non-homogeneous distribution of the applied stresses, thus causing a decreased mechanical strength and the associated occurrence of cracks and failures.

In addition to smoothening the inner pore surface, the coating agent deposited on the surface of the pore may react in situ, thus closing the pores. In fact, the process of the invention allows to obtain porous ceramics having increased closed porosity; the increased closed porosity is not only associated with a higher mechanical strength, but also leads to lower water absorption levels. Water absorption is undesired and commonly not accepted for many traditional ceramic applications.

In another aspect, the present invention provides a green body comprising a mixture of at least a coated porogen intermixed with at least a silicate or an oxide ceramic precursor, wherein the porogen is decomposable to gaseous decomposition products and optionally solid decomposition products upon heating, and is coated with a coating agent.

The green body preferably comprises more than 5% wt. of coated porogen, preferably from 10 to 40% wt., and more preferably from to 20 to 30% wt. The amount of coating agent coating the porogen may range from 1 to 40% wt., based on the weight of the coated porogen.

In a further aspect, the present invention provides a porous ceramic body having total porosity of at least 10%, open porosity lower than 1.5%, and closed porosity of at least 8.5%, wherein the inner surface of the pores is covered by the thermolysis product of a porogen coated with a coating agent; the inner surface of the pores may also be covered by the reaction product of the coating agent with the ceramic precursor. The porous ceramic body is obtainable by decomposing upon heating a porogen coated with a coating agent, as indicated above.

The porous ceramic body has a total porosity preferably ranging from 15 to 30%, and even more preferably from 20 to 25%.

Open porosity is lower than 1.5%, and preferably from 0.01 to 1.0%.

Closed porosity is at least 8.5%, and preferably from 19 to 24%.

Total porosity corresponds to the sum of open porosity and closed porosity. Open porosity refers to pores exposed to the outer surface of the ceramic body, and partly linked with each other, normally giving gas and moisture-permeability. Closed porosity comprises closed pores, non-connected with the surface.

The average pore diameter preferably ranges from 10 to 500 μm, and more preferably from 10 to 100 μm, measured by electron microscope.

The bulk density of the porous ceramic body is preferably lower than 2.4 g/cm$^3$, and most preferably ranges from 1.6 to 2.3 g/cm$^3$. The porous ceramic bodies obtainable by the process of the invention may have a bulk density reduction of at least 8% with respect to the bulk density of a ceramic body obtained from the same ingredients and under the same process conditions, but without using porogens; the bulk density reduction is preferably of 12 to 22%.

Due to the porosity nature and ratios, as indicated above, the porous ceramic bodies may show levels of water absorption lower than 2% wt., and preferably ranging from 0.02 to 1.0% wt.

In the green body and in the porous ceramic body of the invention, the porogen may be a carbon or organic compound as indicated above, and is preferably selected from the group consisting of graphite, cellulose, starch, organic polymers and mixtures thereof.

The coating agent may be as indicated above, and is preferably a ceramic selected from the group consisting of quartz, silica, kaolin, chamotte, mullite, alumina, zirconia, yttrium oxide, titanium oxide, magnesium oxide, calcium oxide, barium oxide and mixtures thereof. According to another embodiment, the coating agent may be selected from the group consisting of feldspar, glass, frits, syenites, aluminum hydroxide, aluminum oxide hydrate, aluminum nitride, silicon nitride, aluminum halides, yttrium halides, zirconium halides, silicon halides, zirconium carbonate, salts of alkaline and alkaline earth metals, and mixtures thereof. The coating agent is preferably selected from the group consisting of aluminium hydroxide, calcium carbonate, magnesium carbonate, calcium hydrogen-phosphate and mixtures thereof. The amount of coating agent coating the porogen may range from 1 to 40% wt., based on the weight of the coated porogen.

The silicate or oxide ceramic precursor of the green body and of the porous ceramic body of the invention is preferably selected from the group consisting quartz, silica, feldspar, kaolin, chamotte, mullite, alumina, zirconia, yttrium oxide, titanium oxide, magnesium oxide, calcium oxide, barium oxide and mixtures thereof.

The porous ceramic bodies show improved porosity, lowered water adsorption, improved thermal and electrical insulation, and good mechanical strength with respect to the strength of a ceramic body obtained from the same ingredients and under the same process conditions, but without using porogens.

The ceramic precursor and the coating agent may be the same or different; according to an embodiment, the ceramic precursor is different from the coating agent.

The bodies of the invention are particularly advantageous for producing tableware, sanitaryware, tiles, bricks, insulators, building and construction materials, as well as technical-silicate ceramics.

The following analytical methods have been used to determine the properties reported in the detailed description and in the examples.

| Property | Method |
|---|---|
| Moisture | water content (%) <br> wc = [(weight$_{wet}$ − weight$_{dry}$)/weight$_{wet}$] × 100 |
| Modulus of Rupture (MOR) | 3-point bending strength based on DIN 51030, on Instron ® instrument (DIN 51223) |
| Bending Strength | DIN EN 843-1 (3-point bending strength), on Instron ® instrument (DIN 51223) |
| True Density ($\rho_t$) | DIN EN 993/2 (Pyknometer, in water at 22° C. and 0.3 bar) |
| Open porosity ($\pi_a$) | DIN EN 993/1 + 2 (in water, at 22° C. and 0.3 bar, with a plastic drier of 25 cm diameter and 13 cm height), <br> wherein: <br> $\pi_a = [(m3 - m1)/(m3 - m2)] \times 100$ <br> the following parameters being determined according to EN 993-1: <br> m1(g) = mass of dried sample <br> m2 (g) = apparent mass of sample in liquid and infiltrated with that liquid <br> m3 (g) mass of liquid infiltrated sample in air |
| Bulk Density ($\rho_b$) | DIN EN 993/1 + 2 (by buoyancy, in water at 22° C. and 0.3 bar), <br> wherein: $\rho_b = [m1/(m3 - m2)] \times \rho_{liquid}$ |
| Total porosity ($\pi_t$) | DIN EN 993/1 + 2 (in water, at 22° C. and 0.3 bar), wherein: $\pi_t = [(\rho_t - \rho_b)/\rho_t] \times 100$ |
| Closed porosity ($\pi_f$) | DIN EN 993/1 + 2 (in water, at 22° C. and 0.3 bar), wherein: $\pi_f = \pi_t - \pi_a$ |
| Water absorption | DIN EN 1217 (water, at 22° C.) |
| Whiteness | DIN 6174 |

EXAMPLES

The following examples are given for illustrative and not limiting purposes.

The following commercial products were used in the preparation of the coated porogens of the process of the invention and in the comparative examples:

JRS101: cellulose fibres, having length of 100 μm and medium diameter of 20 μm, commercialized by Rettenmeyer.

JRS200: cellulose spherical particles, having diameter of 200 μm, commercialized by Rettenmeyer.

JRS FIC500P: cellulose fibres, having length of 500 μm and medium diameter of 30 μm, commercialized by Rettenmeyer.

CaCO3: Calcit, Type K6/L II commercialized by Franz Mandt GmbH, particle size D50 of 5.6 μm.

The coated porogens used in the process of the invention were obtained as follows.

Porogen 1

In a 3-neck round glass-bottle, 1.8 g of polyvinyl alcohol (Polyviol$^R$, commercialized by Wacker Polymer Systems GmbH & Co. KG) was added to 100 ml water, and the mixture was heated at about 95° C. under stirring for 4 hours, using an oil bath with controlled heating device, thus dissolving the alcohol. To the obtained solution, 23 g JRS101 were added under stirring, followed by 2 g calcium carbonate, maintaining the mixture under stirring. The obtained mixture was dried by heating up to 100° C. and distilling the water by using a distilling device, thus causing calcium carbonate and polyvinyl alcohol to deposit onto the porogen.

Porogen 2

The coated porogen was prepared according to the procedure reported above for Porogen 1, with the exception that 5 g calcium carbonate were added.

Porogen 3

In a 3-neck round glass-bottle, 1.8 g of polyacrylate (Sokalan$^R$ PA 40, commercialized by BASF) was added to 100 ml iso-propyl alcohol and dissolved under stirring for 2 hours at 30° C. To the obtained solution, 23 g JRS101, based on the weight of the solution, was added under stirring, followed by 20% wt. calcium carbonate (based on the weight of the fibres), maintaining the mixture under stirring. The obtained mixture was dried by heating up to 85° C. and distilling the i-PrOH by using a distilling device, thus causing calcium carbonate and polyacrylate to deposit onto the porogen.

Porogen 4

The coated porogen was prepared according to the procedure reported above for Porogen 1, with the exception that JRS 200 and 5 g calcium carbonate were used.

Porogen 5

The coated porogen was prepared according to the procedure reported above for Porogen 3, with the exception that JRS200 was used.

Porogen 6

In a 3-neck round glass-bottle, 5.6 g limestone were added via a funnel to 500 ml water, maintained under stirring at 40° C. by means of an oil bath with controlled heating device; calcium oxide reacted to calcium hydroxide. To the obtained solution, 46.0 g of JRS FIC500P were added via a funnel, and $CO_2$ was added under mixing by means of a gas bottle with reducing valve (2-3 bubbles per sec), thus obtaining a suspension. The temperature was increased of 15° C./hour up to a temperature of 80° C., and the mixture was maintained at such temperature under stirring for 3 hours, thus precipitating 9.2 g calcium carbonate, which deposited on the fibres. The obtained mixture was cooled to room temperature and the coated porogen was isolated.

Examples 1-6

The standard mixture for porcelain PP910B, commercialized by Imerys Tableware Deutschland GmbH (comprising 57% wt. of a mixture of kaolins, 42% wt. pegmatite and 1% wt. polyvinyl alcohol) was used as ceramic precursor, the porcelain mixture of Example 6 was the same, but containing about 2% wt. polyvinyl alcohol (Polyviol$^R$, commercialized by Wacker Polymer Systems GmbH & Co. KG).

50 g of said mixture (154 g in Example 6) were added under stirring to 70 ml of water (300 ml in Example 6) thus forming a slurry; the porogens reported in Table 1, in the amounts indicated therein, were added to the slurry, and the resulting mixture was homogenized by mixing.

100 g of the ceramic slurry were dried cautiously at 60° C., maintaining the mixture homogeneous under stirring. The dried ceramic cake, having a moisture content of about 7-8% wt., was crushed to small particles (average diameter lower than 300 μm) and sieved on a screen of 500 μm. The thus obtained ready-to-press powder was pressed in a mould into green bars (30 bars, having size of 100×20×7 mm), by applying a pressure of 300 bars.

The moisture and Modulus of Rupture (MOR) of the obtained green bars were determined for each example, as reported in Table 1.

The green bars were then dried at 110° C. and fired at 950° C. under oxidising atmosphere, for 12 hours. The bars were fired at increasing temperature up to 1100° C., in 2 hours, under oxidizing atmosphere, and then under reducing atmosphere at temperatures higher than 1100° C. up to 1400° C., for 4 hours.

The bulk and true density, total porosity, open porosity, closed porosity, bending strength, water adsorption and whiteness of the obtained porous ceramic bodies were characterised for each example, as reported in Table 2.

Comparative Examples 1-5

The procedure of Example 1 was repeated by using, instead of the coated porogens of the process of the invention, the products indicated in Table 1, in the amounts reported therein.

The data reported in Table 2 show that the porous ceramic bodies of the invention achieve a relevant reduction in density, at the same time maintaining good levels of bending strength and the desired levels of water adsorption.

More specifically, the ceramic bodies of the invention show a desirable density reduction as compared to ceramic bodies obtained in the absence of coated porogen (Comp. Ex. 1) or with $CaCO_3$ (Comp. Ex. 2); moreover, the process of the invention leads to ceramic bodies maintaining good levels of bending strength, while the use of uncoated porogens has very negative effects on mechanical strength and water adsorption levels (Comp. Ex. 3-5). Although only preferred embodiments of the invention are specifically disclosed and exemplified above, it will be appreciated that many modifications and variations of the present invention are possible in the light of the teachings, within the scope of the invention as defined by the appended claims.

TABLE 1

| Example | Porogen | Coating agent amount (% wt.) | Porogen amount (% wt.) | Moisture (% wt.) | MOR (MPa) |
|---|---|---|---|---|---|
| Example 1 | Porogen 1 | 2.0 | 23 | 7.2 | 1.01 |
| Example 2 | Porogen 2 | 4.8 | 23 | 6.9 | 1.02 |
| Example 3 | Porogen 3 | 20.0 | 23 | 7.4 | 0.91 |
| Example 4 | Porogen 4 | 4.8 | 23 | 7.5 | 0.91 |
| Example 5 | Porogen 5 | 20.0 | 23 | 10.8 | 0.78 |
| Example 6 | Porogen 6 | 20.0 | 23 | 6.2 | 0.46 |
| Comp. Ex. 1 | — | 0 | 0 | 6.3 | 0.90 |
| Comp. Ex. 2 | $CaCO_3$ | 0 | 4.8 | 7.7 | 0.85 |
| Comp. Ex. 3 | JRS101 | 0 | 23 | 7.7 | 0.90 |
| Comp. Ex. 4 | JRS 200 | 0 | 23 | 9.6 | 0.74 |
| Comp. Ex. 5 | JRS FIC500P | 20.0 | 23 | 7.6 | 0.87 |

TABLE 2

| Example | True Density (g/cm$^3$) | Bulk Density (g/cm$^3$) | Bulk Density reduction (%) | Total Porosity (%) | Open Porosity (%) | Closed Porosity (%) | Bending Strength (MPa) | Water adsorption (% wt.) | Whiteness |
|---|---|---|---|---|---|---|---|---|---|
| Example 1 | 2.48 | 2.17 | 12 | 12.5 | 1.0 | 11.5 | 50 | 0.44 | 72.4 |
| Example 2 | 2.48 | 2.17 | 12 | 12.5 | 0.2 | 12.3 | 48 | 0.08 | 72.6 |
| Example 3 | 2.49 | 2.23 | 10 | 10.4 | 0.2 | 10.3 | 49 | 0.08 | 73.5 |
| Example 4 | 2.47 | 1.93 | 22 | 21.9 | 1.0 | 20.8 | 34 | 0.55 | 72.5 |
| Example 5 | 2.49 | 2.23 | 10 | 10.4 | 0.1 | 10.3 | 50 | 0.06 | 73.5 |
| Example 6 | 2.49 | 2.29 | 8 | 10.0 | 0.3 | 9.7 | 51 | 0.14 | 72.2 |

TABLE 2-continued

| Example | True Density (g/cm³) | Bulk Density (g/cm³) | Bulk Density reduction (%) | Total Porosity (%) | Open Porosity (%) | Closed Porosity (%) | Bending Strength (MPa) | Water adsorption (% wt.) | Whiteness |
|---|---|---|---|---|---|---|---|---|---|
| Comp. Ex. 1 | 2.50 | 2.47 | — | 2.4 | 0.1 | 2.0 | 62 | 0.04 | 69.0 |
| Comp. Ex, 2 | 2.47 | 2.30 | 7 | 6.9 | 0.1 | 6.8 | 54 | 0.04 | 72.9 |
| Comp. Ex. 3 | 2.47 | 1.92 | 22 | 22.3 | 19 | 3.2 | 31 | 9.90 | 72.0 |
| Comp. Ex. 4 | 2.47 | 1.77 | 28 | 28.3 | 22.5 | 5.8 | 24 | 12.7 | 70.4 |
| Comp. Ex. 5 | 2.48 | 1.61 | 24 | 35.6 | 17.1 | 18.5 | 34 | 11.5 | 72.4 |

The invention claimed is:

1. A method for making a porous ceramic body comprising:
   providing a porogen comprising a particulate material selected from carbon and an organic compound;
   coating the porogen with a coating agent comprising a material selected from the group consisting of quartz, silica, kaolin, chamotte, mullite, alumina, zirconia, yttrium oxide, titanium oxide, magnesium oxide, and mixtures thereof, wherein the amount of coating ranges from 3%-20% by weight of the coated porogen;
   admixing the coated porogen into an oxide ceramic precursor comprising a material different than the coating material, wherein the coated porogen comprises at least 5% by weight of the mixture;
   forming the mixture into a green body;
   firing the green body to obtain a porous ceramic body having a total porosity of at least 10%, an open porosity lower than 1.5% and a closed porosity of at least 8.5%, wherein the inner surface of the pores of the porous ceramic body are coated with a thermolysis product of said coated porogen.

2. The method of claim 1, wherein said porogen is a spherical particle or a fibre.

3. The method of claim 1, wherein forming the green body comprises at least one of casting, pressure casting, jiggering, extruding or press processing.

4. The method of claim 3, wherein press processing is performed at a pressure ranging from 200 to 3000 bars and a temperature ranging from 15 to 40° C.

5. The method of claim 3, wherein pressure casting is performed at a pressure ranging from 20 to 40 bars.

6. The method of claim 1, wherein the firing is carried out at a temperature ranging from 150 to 1800° C., for a time ranging from 0.5 to 70 hours.

7. The method of claim 1, wherein coating the porogen comprises adding the coating agent to a liquid containing said porogen to form a suspension.

8. The method of claim 7, wherein said liquid comprises water or an alcohol.

9. The method of claim 7, wherein said suspension further comprises a binder system.

10. The method of claim 9, wherein said binder system comprises polyacrylate or polyvinyl alcohol.

11. The method of claim 1, wherein coating the porogen comprises adding the coating agent to a suspension comprising water and a binder system comprising polyvinyl alcohol.

12. The method of claim 1, wherein coating the porogen comprises adding the coating agent to a suspension comprising alcohol and a binder system comprising polyacrylate.

13. The method of claim 1, wherein the coated porogen comprises from 10-40% by weight of the mixture.

14. The method of claim 1, wherein admixing the coated porogen and oxide ceramic precursor is performed in the presence of a dispersant, a binder system or both.

15. The method of claim 14, wherein said dispersant comprises sodium silicate or sodium hydroxide.

16. The method of claim 15, wherein said dispersant is present in an amount ranging from 0.05 to 0.5% by weight based on the total weight of the mixture.

17. The method of claim 14, wherein said binder system comprises polyvinyl alcohol, polyvinyl acetate, polyethylene glycol, silanes, and mixtures thereof.

* * * * *